United States Patent [19]
Holdeman et al.

[11] 3,884,377

[45]*May 20, 1975

[54] STACK MOVING IMPLEMENT

[75] Inventors: Adin F. Holdeman, Hesston; Melvin V. Gaeddert, Newton, both of Kans.

[73] Assignee: Hesston Corporation, Hesston, Kans.

[ * ] Notice: The portion of the term of this patent subsequent to May 20, 1992, has been disclaimed.

[22] Filed: Apr. 30, 1973

[21] Appl. No.: 355,932

[52] U.S. Cl. ............ 214/767; 214/144; 280/461 A; 214/776
[51] Int. Cl. ............................................. E02f 3/00
[58] Field of Search .......... 214/766, 506, 144, 390, 214/501, 767; 280/43.11, 43.12, 43.17, 43.22, 43.23, 461 A, 479 R

[56] References Cited
UNITED STATES PATENTS
| | | | |
|---|---|---|---|
| 1,187,742 | 6/1916 | Johnson | 214/144 |
| 3,635,492 | 1/1972 | Mauldin | 214/506 |

*Primary Examiner*—Albert J. Makay
*Attorney, Agent, or Firm*—Schmidt, Johnson, Hovey & Williams

[57] ABSTRACT

A mover, especially adapted for transporting haystacks through use of a tractor, is supported in part by the latter through a drawbar hitch or a three-point hitch and partially by a pair of ground wheels. In each case, the stack is both raised off the ground and tilted toward the tractor prior to being towed to a point of unloading.

18 Claims, 9 Drawing Figures

PATENTED MAY 20 1975

STACK MOVING IMPLEMENT

In the moving of haystacks through use of tines that are inserted beneath the stack during loading, it is desirable, in addition to raising the tines off the ground, to tilt them such as to not only shift the weight of the stack toward the tractor but place the stack in an attitude where it will not become displaced from the tines during transport. Such is accomplished through use of the improvements of the instant invention, permitting the movement of rather heavy loads without unduly reducing the weight of the tractor on its front steering wheels.

In addition, to further prevent loss of adequate steering control, the load is also supported by ground wheels so located as to place the stack between the hitch and the wheels. A number of embodiments are provided so as to adapt the mover to various types of tractor hitches. In the drawings.

Figure 1:
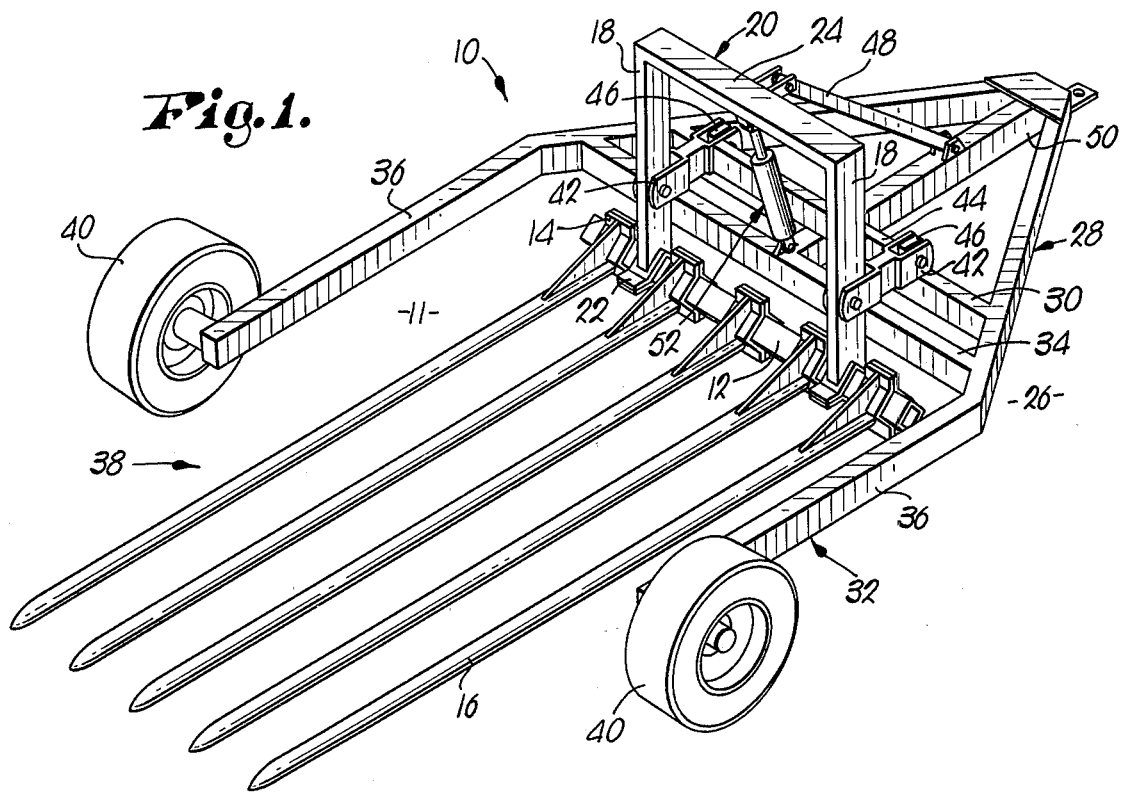
FIG. 1 is a rear top perspective view of a stack moving implement made according to one embodiment of our present invention.
Figure 2:
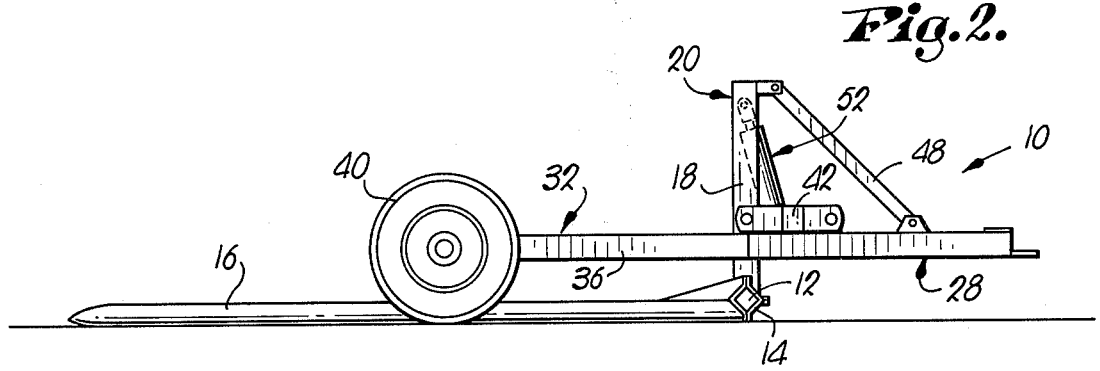
FIG. 2 is a side elevational view showing the mover in position ready for receiving a stack.
Figure 3:
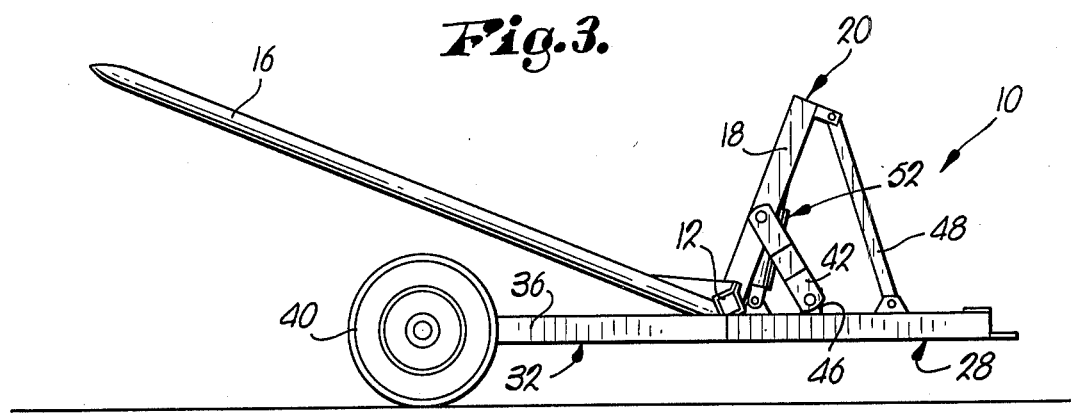
FIG. 3 is a view similar to FIG. 2 illustrating the position of the components of the mover during transport of the stack.

In FIGS. 1—3, a trailer-type stack moving implement 10 includes an L-shaped stack carrying unit 11 having a front, transverse beam 12 to which are releasably attached, by clamps 14, a plurality of spaced, rearwardly extending tines 16 and a pair of upstanding legs 18 of a U-shaped mast 20 by clamps 22. The legs 18 are integrally joined at their upper ends by a crosspiece 24.

The unit 11 is supported by a chassis 26 which includes a tongue 28, having a cross member 30 and a U-shaped frame 32 integral with the tongue 28. The frame 32 has a bight 34 and an arm 36 at each side respectively of the unit 11, presenting a rearwardly opening, stack receiving throat 38. The tines 16 normally rest on the ground as seen in FIG. 2 between ground wheels 40 at the rear end of each arm 36 respectively.

A four-point linkage includes a pair of lower links 42, joined by a crosshead 44, and pivotally connecting the legs 18 with upstanding lugs 46 on the cross member 30, and an upper link 48 pivotally connecting the crosspiece 24 with a center strut 50 forming a part of the tongue 28. A fluid pressure ram 52 pivotally connects the crosspiece 24 with the bight 34.

When the implement 10 is positioned as illustrated in FIG. 2, tongue 28 being attached to the drawbar of a tractor (not shown), the tines 16 are forced beneath the stack by reversing the tractor. The ram 52 is then actuated to raise the unit 11 to the position shown in FIG. 3. The link 48 being longer than and out of parallelism with the links 42, the tines 16 tilt the stack as its forward movement along the tines 16 is restrained by the mast 20. The stack, pocketed within the angle between the tines 16 and the mast 20, is carried, therefore, between the wheels 40 and the tractor drawbar during transport. For unloading, the tines 16 are lowered to the ground and then withdrawn from beneath the stack.

In FIGS. 4–7, a stack moving implement 110 includes an L-shaped stack carrying unit 111 having a beam 112 with tines 116 and a mast 120 secured thereto in a manner which may be the same as or similar to the arrangement of FIGS. 1–3. End pieces 135 rigid to such beam 112 pivotally receive arms 136 which, in turn, are each provided with a ground wheel 140. Each end piece 135 is connected with a corresponding arm 136 by a fluid pressure device 139.

Tractor 141 has a three-point hitch which includes a pair of horizontally spaced, vertically swingable lift elements 142 and a stabilizer element 148, all three of which are pivotally attached to the mast 120. The element 148 has a pair of links 149 and 151 provided with a hinged toggle joint 153. A fluid pressure ram 153 pivotally interconnects the beam 112 with the joint 153. The link 149 has pivotal connection with the tractor 141 at anchor 155 of the latter, whereas pivot pins 157 on legs 118 of the mast 120 receive the elements 142.

Figure 8:
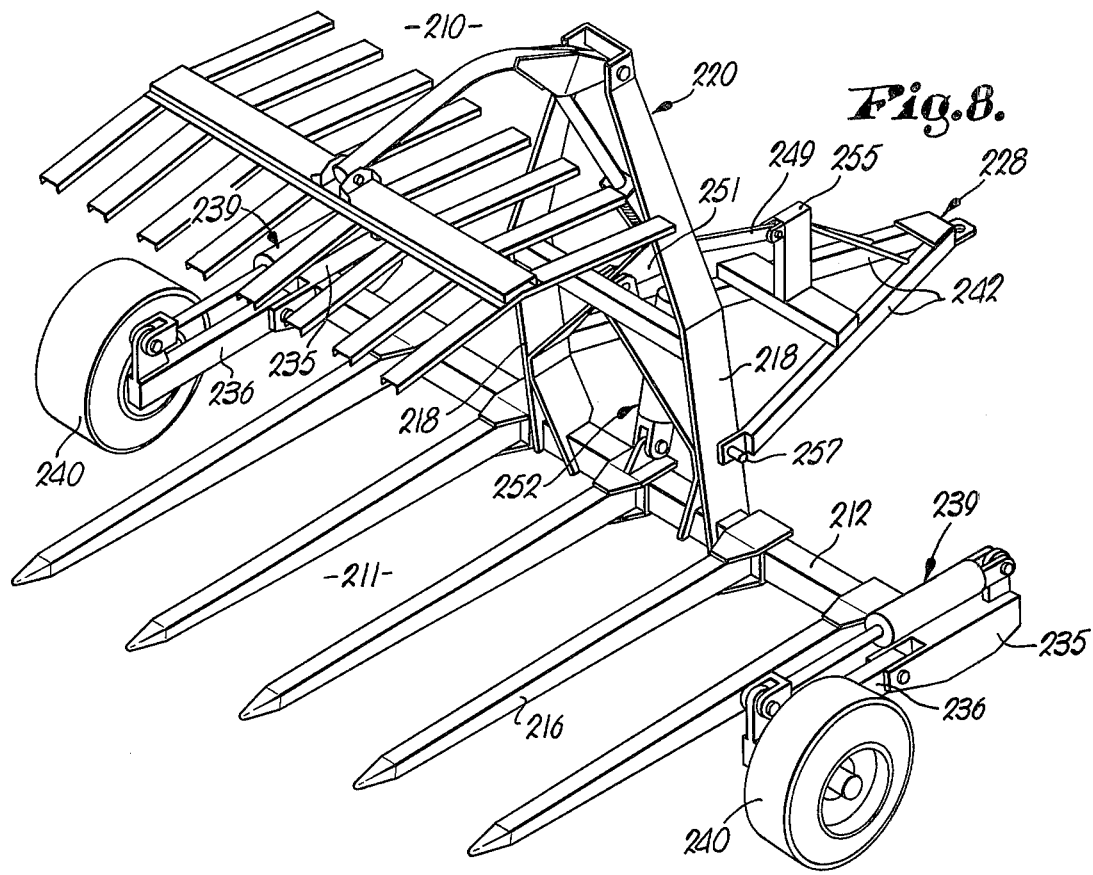
FIG. 8 is a view similar to FIG. 1 illustrating another embodiment of a stack moving implement.

While the implement 110 is semimounted on the tractor 141, comparable components are provided in the implement 210 shown in FIG. 8. Carrying unit 211 includes a beam 212 that is provided with tines 216, a mast 220 having a pair of legs 218 and end pieces 235 on the beam 212, the same as in the implement 110. Also, as in FIGs. 4–7, wheels 240 support arms 236 which are swingable on the end pieces 235 and connected with the latter by fluid pressure devices 239.

When the implement 110 is removed from the tractor 141 it may be readily converted to the implement 210 of FIG. 8 by substituting a tongue 228 for the elements 142 and substituting a link 249 for the link 149.

Pivot pins 257 on legs 218 of the mast 220 receive elements 242 of the tongue 228 whereas an anchor 255 on the tongue 228 pivotally receives the link 249. Ram 252 and link 251 remain the same as ram 152 and link 151 respectively.

Figure 9:
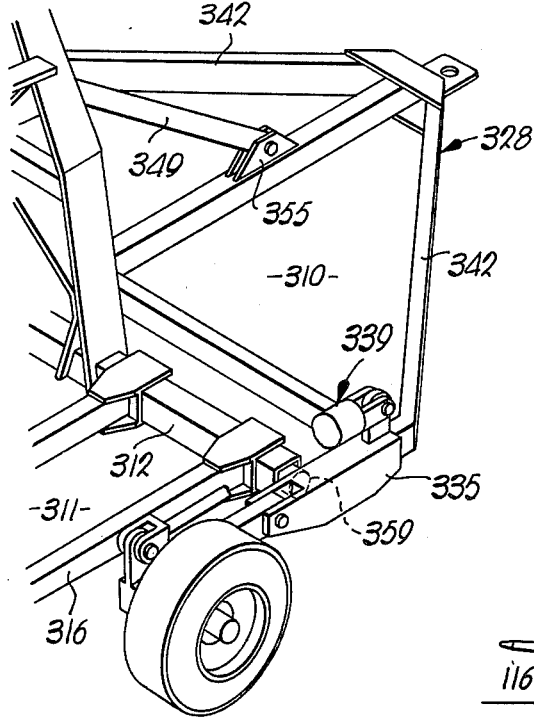
FIG. 9 is a fragmentary perspective view similar to FIG. 8 showing still another form of our present invention.

In the embodiment of FIG. 9, implement 310 has a tongue 328 whose elements 342 are rigid to end pieces 335. The elements 335 are rigid to the ends of a shaft 359 which is rotatably received by tubular beam 312. Link 349 is pivotally connected to anchor 355 on the tongue 328. Otherwise, the implement 310 is the same as the implement 210.

Insofar as raising and lowering is concerned, the implements 110, 210, and 310 are the same. Actuation of the devices 139, 239 and 339 raises and lowers the units 111, 211 and 311 as shown, for example, in FIG. 4, as distinguished from FIGS. 1–3 wherein the arms 36 are rigid to the tongue 28. However, in FIGS. 4–7, the implement 110 may be raised still farther to raise the wheels 140 off the ground during over-the-road travel, for example, by use of the hydraulics of the tractor to elevate the elements 142.

Figure 4:
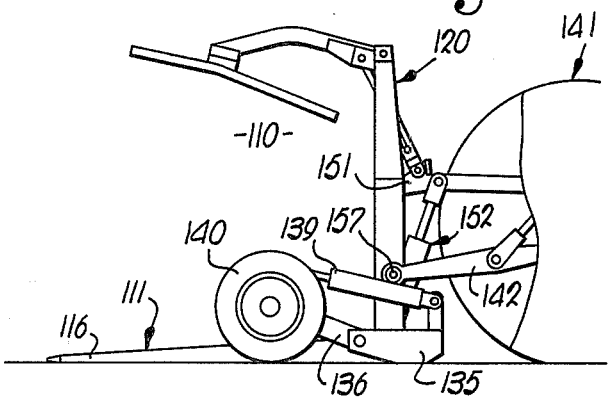
FIG. 4 is a side elevational view similar to FIG. 2 illustrating a modified form of a stack moving implement attached to a tractor, the latter being illustrated fragmentarily and partially broken away for clearness.
Figure 5:
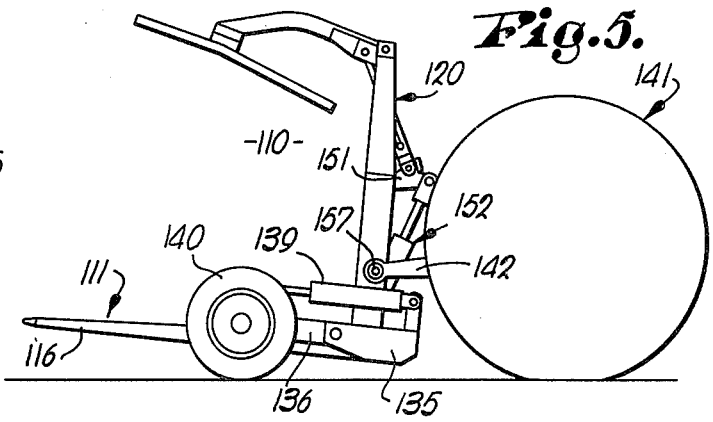
FIG. 5 is a view similar to FIG. 3 showing the embodiment of FIG. 4.
Figure 6:
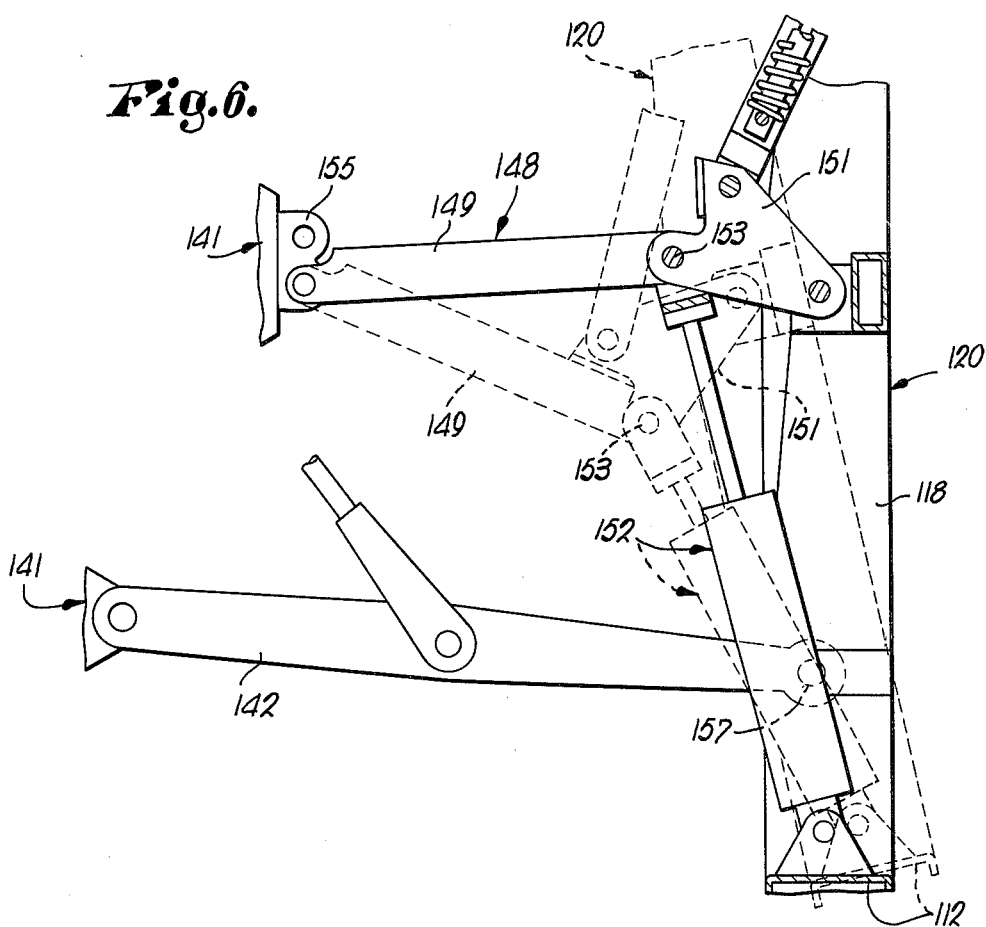
FIG. 6 is an enlarged view illustrating the connection of the mover with the tractor when the mover is in the position shown by FIG. 4.
Figure 7:
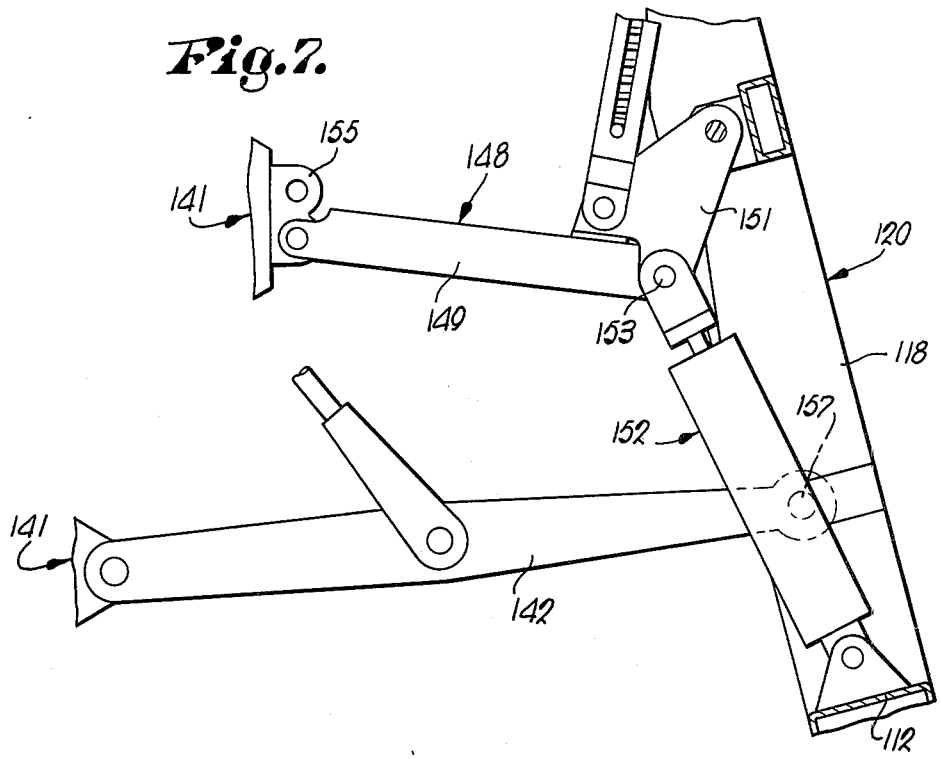
FIG. 7 is a view similar to FIG. 6 illustrating the position of the connection with the tractor when the mover is in the position illustrated by FIG. 5.

Tilting of the tines 116, 216 and 316 is effected by the operation best illustrated in FIGS. 4–7. After the stack is loaded on the tines 116, while the latter are disposed as shown in FIG. 4, the piston of ram 152 is retracted, breaking the joint 153 until the link 151 contacts the link 148. The hydraulics of the tractor 141 hold the elements 142 against downward movement but permit the same to move upwardly. Thus, after the tines 116 are tilted by the action of the ram 152, the devices 139 are extended to raise the unit 111 to the position shown in FIG. 5. The stack is thus carried by the tractor 141 and by the wheels 140 during transport.

Having thus described the invention, what is claimed as new and desired to be secured by Letters Patent is:

1. A stack moving implement comprising:
   an L-shaped stack carrying unit having a front transverse beam, a mast rigid to said beam and extending upwardly therefrom, and a plurality of spaced tines rigid to the beam and extending rearwardly therefrom;
   a support carrying said unit including an arm at each side respectively thereof and a ground wheel for each arm respectively,
   said tines normally resting on the ground between said wheels; and
   an assembly for raising and lowering said unit with respect to the wheels including mechanism for tilting the unit to a position disposing the tines on an incline extending upwardly and rearwardly from the beam.

2. A stack moving implement as claimed in claim 1, there being a chassis provided with a tongue and a U-shaped frame having a bight integral with the tongue, presenting a rearwardly opening, stack receiving throat, said arms being integral with the bight and extending rearwardly therefrom.

3. A stack moving trailer as claimed in claim 2, said assembly including a four-point linkage pivotally coupling the mast and said tongue.

4. A stack moving trailer as claimed in claim 2, said assembly including a four-point linkage pivotally coupling the mast and said tongue, and a fluid pressure ram pivotally interconnecting the mast and said bight.

5. A stack moving implement as claimed in claim 4, said mast being U-shaped, presenting a pair of horizontally spaced, upright legs and a crosspiece integrally interconnecting the upper ends of the legs, said ram being pivotally connected to said crosspiece.

6. A stack moving implement as claimed in claim 5, said linkage including a link pivotally connected with each leg and with said crosspiece respectively.

7. A stack moving implement as claimed in claim 1, said assembly including pivot means swingably connecting each arm respectively with said beam, and a fluid pressure device pivotally coupled with each arm respectively for swinging the arms about their pivot means.

8. A stack moving implement as claimed in claim 7 adapted for use with a three-point tractor hitch of the kind having a pair of lower lifting elements and an upper stabilizer element, said elements being swingable vertically on the tractor, said mast having means pivotally connecting the same with said elements.

9. A stack moving implement as claimed in claim 8, said assembly including a fluid pressure ram pivotally interconnecting the mast and said stabilizer element for tilting said unit.

10. A stack moving implement as claimed in claim 9, said stabilizer element having a pair of links pivotally interconnected to present the joint of a toggle, said ram being connected with the toggle at its joint for breaking the latter.

11. A stack moving implement as claimed in claim 1; and a tongue for towing the implement on said wheels.

12. A stack moving implement as claimed in claim 11, said tongue being pivotally connected to said unit.

13. A stack moving implement as claimed in claim 12, said tongue being pivotally connected to the mast.

14. A stack moving implement as claimed in claim 13, said assembly including a pair of links pivotally interconnecting the tongue and the mast, said links being pivotally interconnected to present the joint of a toggle; and power means for breaking the joint.

15. A stack moving implement as claimed in claim 14, said power means being a fluid pressure ram pivotally interconnecting the toggle and said beam.

16. A stack moving implement as claimed in claim 12, said tongue being pivotally connected to said beam.

17. A stack moving implement as claimed in claim 16, said assembly including a pair of links pivotally interconnecting the tongue and the mast, said links being pivotally interconnected to present the joint of a toggle; and power means for breaking the joint.

18. A stack moving implement as claimed in claim 17, said power means being a fluid pressure ram pivotally interconnecting the toggle and said beam.

* * * * *